United States Patent [19]

Korenblit

[11] Patent Number: 5,030,018
[45] Date of Patent: Jul. 9, 1991

[54] ADJUSTMENT DEVICE FOR CENTRIFUGAL PUMP IMPELLER

[75] Inventor: Izya Korenblit, Cincinnati, Ohio

[73] Assignee: ITT Corporation, New York, N.Y.

[21] Appl. No.: 579,133

[22] Filed: Sep. 6, 1990

[51] Int. Cl.⁵ .............................................. F16C 25/06
[52] U.S. Cl. .................................................. 384/519
[58] Field of Search ............... 384/519, 583, 258, 247, 384/540, 584

[56] References Cited

U.S. PATENT DOCUMENTS

| | | | |
|---|---|---|---|
| 1,200,932 | 10/1916 | Ferguson | 384/519 |
| 3,580,648 | 5/1971 | Zink | 384/583 |
| 4,531,847 | 7/1985 | F'Geppert | 384/519 |
| 4,611,934 | 9/1986 | Piotrowski et al. | 384/519 |

Primary Examiner—Lenard A. Footland
Attorney, Agent, or Firm—Menotti J. Lombardi

[57] ABSTRACT

An adjustment device to move a pump rotor assembly to effect desired impeller clearance without causing misalignment. The arrangement provides for rigid contact between bearing housing and frame and for sealing to protect the device from exposure.

20 Claims, 1 Drawing Sheet

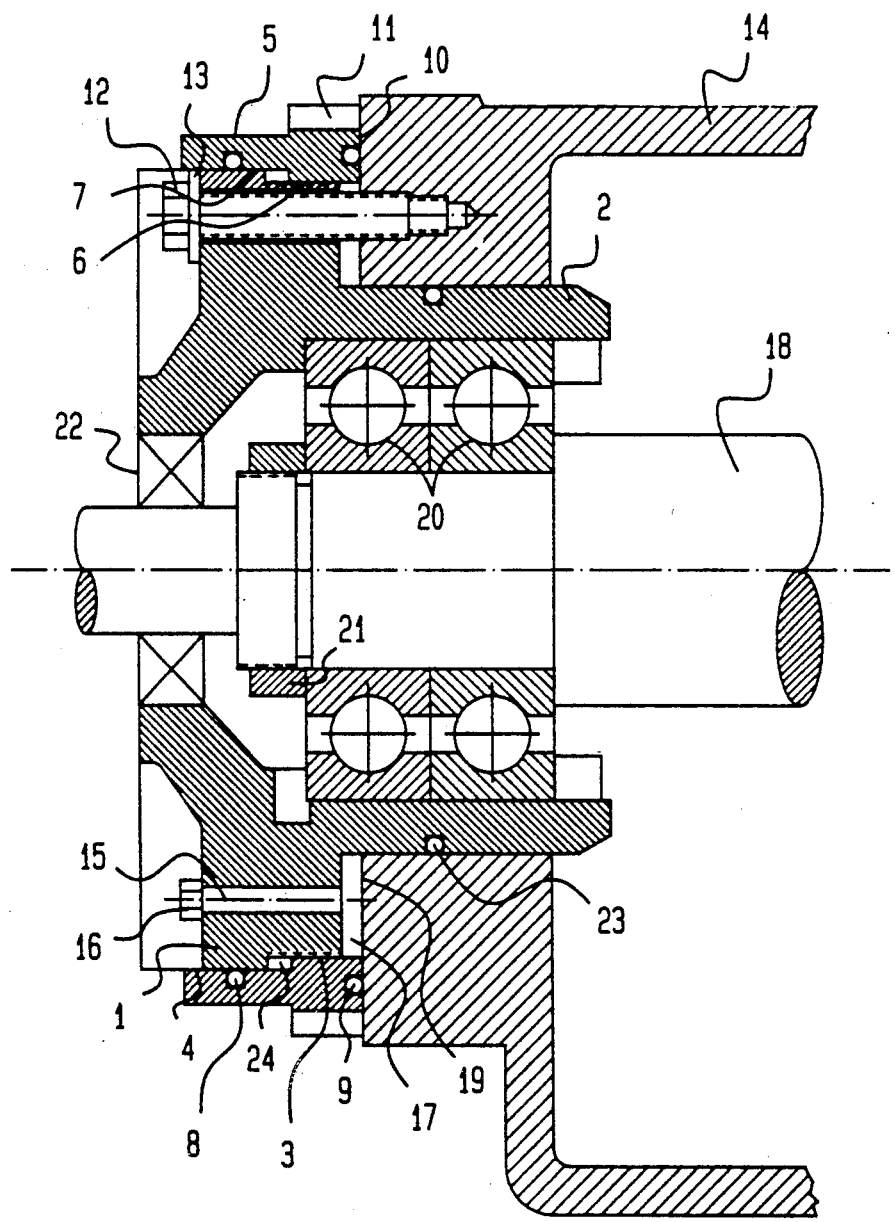

ADJUSTMENT DEVICE FOR CENTRIFUGAL PUMP IMPELLER

BACKGROUND OF THE INVENTION

The invention relates to centrifugal pumps, and more particularly to an adjustment device for movement of the rotor assembly to effect adjustment of impeller clearance.

The clearance between the front or rear of an open impeller and the stationary parts effects centrifugal pump performance. Therefore, as known from the prior art, a pump has to have a device to adjust the impeller clearance during the assembly and some times in the field due the wear of the stationary parts.

Usually such adjustment is provided by moving rotor assembly forward toward the suction side or backward away from the suction side. In one known adjustment device, three micrometer screws are located on the flange of the bearing housing, and adjustment is made by turning the screws. This design requires precision turning of each screw to avoid locking of the housing in the frame. The housing also requires a relatively long fit, and the gap between face of housing and face of frame does not provide a rigid contact of these two parts. Therefore, this design can cause misalignment of the pump and motor shafts.

In another known adjustment device, three jacking screws and three bolts provide the impeller adjustment. This arrangement has similar disadvantages in causing possible misalignment of the pump and motor shafts.

In a further known adjustment device, the bearing housing is threaded into the frame and locked in position by three set screws. Adjustment is made by turning the notched flange of the housing. This device requires long housing fit, which significantly reduces the useful area inside the frame.

Accordingly, the problem of adjusting the rotor assembly and resulting clearance of the impeller is solved by the device of the invention.

SUMMARY OF THE INVENTION

An object of the invention is to provide an improved adjusting device for centrifugal pump impeller.

According to the broader aspects of the invention, the adjustment device moves the pump rotor assembly to effect the desired clearance of the impeller without misaligning the pump and motor shafts, and provides for rigid contact between bearing housing and frame and for protection of the device from exposure.

BRIEF DESCRIPTION OF THE DRAWING

The above-mentioned and other objects and advantages of this invention will become more apparent by reference to the following description taken in conjunction with the accompanying sole drawing which is a cross-section view showing the adjusting device according to the invention.

BRIEF DESCRIPTION OF PREFERRED EMBODIMENT

Referring to the drawing, the impeller shaft assembly adjustment device of the invention is illustrated. The flange portion 1 of bearing housing 2 has a smooth external portion 4 at a first diameter. The housing 2 has a threaded portion 3 stepped down at a second smaller diameter from said first diameter. A ring 5 has an internal threaded portion 6 at the second diameter for threading and unthreaded portion 7 at the first diameter for sliding. An O-ring 8 is located in a groove in the unthreaded portion 7 of the ring 5, and an O-ring 9 is located in a groove on the face 10 of ring 5. Ring 5 has a number of notches 11 about its outside diameter, these notches could also be blind holes or other turning means. Preferably, three equally spaced screws 12 with washers 13 are positioned in housing 2 to secure bearing housing 2 to pump frame 14 adjacent the pump chamber side of pump in a known manner. Bearing housing 2 also includes a hole 15 and grease fitting 16 to enable filling gaps 17 and 24 with grease during assembly or in the field.

Impeller clearance in the pump chamber may be adjusted by moving impeller shaft 18 and its assembly including impeller in a quick and easy manner without effecting the alignment of the pump and motor shafts. To adjust the impeller front clearance, screws 12 are first loosened. Then, the impeller rotor 18 on which is mounted in the normal manner the impeller (not shown), is moved toward the right of the drawing or forward by turning ring 5 counterclockwise. By turning, a space is created between face 10 of ring 5 and face 19 of frame 14, which represents the desired movement of the rotor 18 and the impeller forward in the pump chamber toward the suction end of the pump.

After the desired movement of the rotor assembly is achieved which represents the impeller clearance in the pump chamber, set screws 12 are retightened. This action will move the rotor assembly forward until rigid contact between face 10 of ring 5 and face 19 of frame 14 is achieved.

To move the impeller rotor 18 and its impeller to the left of the drawing or backward from the suction end of the pump, screws 12 are loosened and ring 5 is turned clockwise. This action sets the desired impeller clearance in the pump chamber. When the desired position is achieved, the screws 12 are retightened.

Gaps 17 and 24 which are filled with grease, O-rings 8,9, and washers 13 provide the sealing protection for the adjustment threads from corrosion and moisture. Also shown in the drawing are double pump shaft bearings 20, a bearing load adjustment ring 21, a shaft seal ring 22, and O-ring 23 which is positioned in the slidably mounted surface between the housing and frame.

While the present invention has been disclosed in connection with a preferred embodiment thereof, it should be understood that this is only by way of example and not as a limitation of the invention as defined by the following claims.

What is claimed is:
1. In combination:
   a bearing housing slidably mounted in a frame, said housing having a flange with a smooth external portion at a first diameter, and an external threaded portion at a second diameter smaller than said first diameter;
   a pump shaft rotatably mounted in said housing and axially moveable with said housing;
   a ring having an internal threaded portion for engaging said external threaded portion at said second diameter, and having a smooth internal portion for slidable movement on said smooth external portion at said first diameter;
   said housing having face surface positioned opposite a face surface of said frame, and said frame and bearing faces being perpendicular to the axis of said pump shaft, and defining a gap there between;

means for turning said ring in a clockwise or counterclockwise to increase or decrease said gap; and means for fixing said housing to said frame and causing a face surface of said ring to remain in contact with said frame face surface, whereby the increase or decrease of said gap causes a corresponding axial adjustment of said pump shaft.

2. The combination of claim 1, wherein said means for turning said ring includes a plurality of notches about the outer diameter of said ring.

3. The combination of claim 1, wherein said means for fixing include a plurality of screws being threaded in said housing and frame.

4. The combination of claim 1 including an O-ring located in said ring at said first diameter.

5. The combination of claim 1 including an O-ring located in said ring at said face surface.

6. The combination of claim 1 including another gap between said housing and said smooth internal portion of said ring.

7. The combination of claim 6 including means in said housing for coupling grease to said gap and said other gap.

8. The combination of claim 1 including an O-ring positioned in said housing at the surface which slidably mounts said housing in said frame.

9. The combination of claim 1 including double bearing means for rotatably mounting said shaft in said housing.

10. The combination of claim 1 including a shaft seal positioned to mount said pump shaft in said housing.

11. An impeller shaft assembly adjusting device comprising:
a bearing housing slidably mounted in a frame, said housing having a flange with a smooth external portion at a first diameter, and an external threaded portion at a second diameter smaller than said first diameter;
a pump shaft rotatably mounted in said housing and axially moveable with said housing;
a ring having an internal threaded portion for engaging said external threaded portion at said second diameter, and having a smooth internal portion for slidable movement on said smooth external portion at said first diameter;
a frame face on said frame being opposite a bearing face on said housing and being perpendicular to the axis of said pump shaft, and defining a gap there between;
means including a plurality of notches in said ring for turning said ring in a clockwise or counterclockwise to increase or decrease said gap; and
means including a plurality of screws for fixing said housing to said frame and causing a face of said ring to remain in contact with said frame face, whereby the increase or decrease of said gap causes a corresponding axial adjustment of said pump shaft.

12. The device of claim 11 including an O-ring located in said ring at said first diameter, and an O-ring located in said face of said ring.

13. The device of claim 12 including another gap located between said smooth internal portion of said ring and said housing.

14. The device of claim 13 including means in said housing for coupling grease to said gap and said other gap.

15. The device of claim 14 including an O-ring position in said housing at the surface which slidably mounts said housing in said frame.

16. In combination:
a bearing housing slidably mounted in a frame, said housing having a flange with a smooth external portion at a first diameter and an external threaded portion at a second diameter smaller than said first diameter;
a pump shaft bearing mounted in said housing and axially moveable with said housing;
a ring having an internal threaded portion for engaging said external threaded portion at said second diameter, and having a smooth internal portion for slidable movement on said smooth external portion at said first diameter;
said frame having a face opposite a face in said housing, and said faces being perpendicular to the axis of said pump shaft, and defining a gap there between, said gap including grease therein;
means for turning said ring in a clockwise or counterclockwise to increase or decrease said gap;
means for fixing said housing to said frame and causing a face of said ring to remain in contact with said frame face, whereby the increase or decrease of said gap causes a corresponding axial adjustment of said pump shaft; and
means to provide sealing protection for said threaded portions.

17. The combination of claim 16, including means for coupling grease to said gap.

18. The combination of claim 17 wherein said sealing means includes an O-ring in said ring at said face frame, and an O-ring in said ring at said first diameter.

19. The combination of claim 18 including another gap located between said smooth internal portion of said ring and said housing.

20. The combination of claim 19 including an O-ring in said housing at the surface which slidably mounts said housing in said frame.

* * * * *